United States Patent [19]

Gerhart et al.

[11] Patent Number: 4,490,851
[45] Date of Patent: Dec. 25, 1984

[54] TWO-DIMENSIONAL IMAGE DATA REDUCER AND CLASSIFIER

[75] Inventors: Grant R. Gerhart; James M. Graziano, both of Oakland, Mich.

[73] Assignee: The United States of America as represented by the Secretary of the Army, Washington, D.C.

[21] Appl. No.: 369,045

[22] Filed: Apr. 16, 1982

[51] Int. Cl.³ .................... G06K 9/36; G06F 15/332
[52] U.S. Cl. ........................... 382/43; 382/18; 382/28
[58] Field of Search .................. 382/43, 18, 28, 51; 364/576, 726, 827; 324/77 B; 358/125, 126

[56] References Cited

U.S. PATENT DOCUMENTS

| | | | |
|---|---|---|---|
| 3,466,431 | 9/1969 | Fuchs et al. | 364/485 |
| 3,803,553 | 4/1974 | Nakono et al. | 382/28 |
| 3,836,712 | 9/1974 | Kornreich et al. | 382/43 |
| 3,846,752 | 11/1974 | Nakono et al. | 382/43 |
| 3,930,230 | 12/1975 | Stephens | 382/18 |
| 4,316,218 | 2/1982 | Gay | 358/125 |

Primary Examiner—John C. Martin
Assistant Examiner—Michael D. Parker
Attorney, Agent, or Firm—Peter A. Taucher; John E. McRae; Robert P. Gibson

[57] ABSTRACT

This invention relates to surveillance and counter-surveillance classification of military vehicles using one-dimensional analysis of the target images. A two-dimensional image is digitized into a n by n pixel matrix which is summed along each row and column to produce a pair of n-component vectors which are invariant under image translation or rotation. A one-dimensional Fourier transform can be obtained from either or both of these two vectors. The image vectors are useful in the identification of U.S. and threat vehicle targets, or in the detection of target image motion.

1 Claim, 5 Drawing Figures

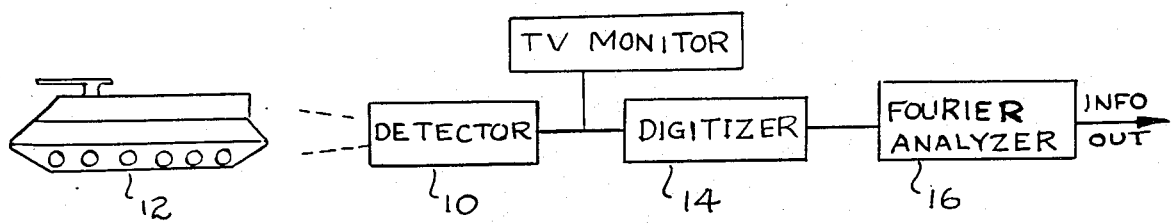
FIG. 1
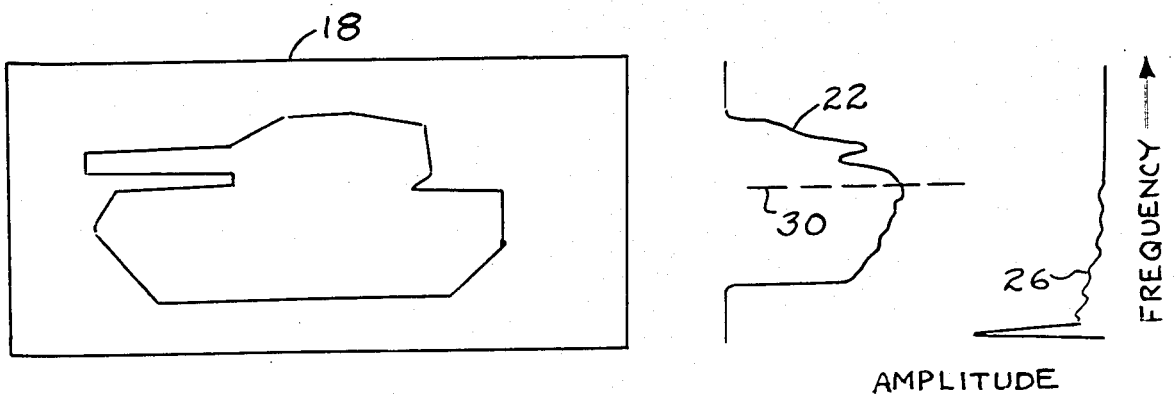
FIG. 2
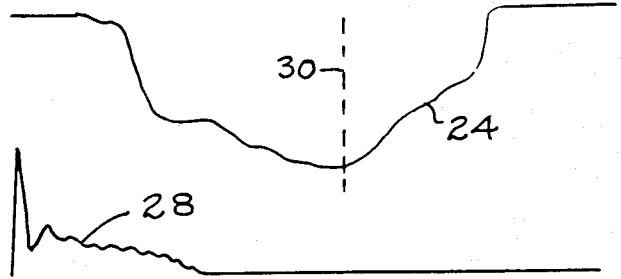
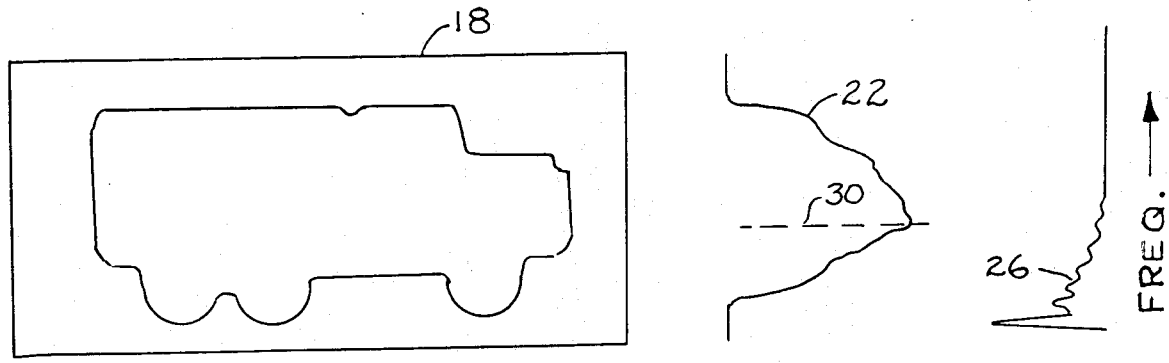
FIG. 3
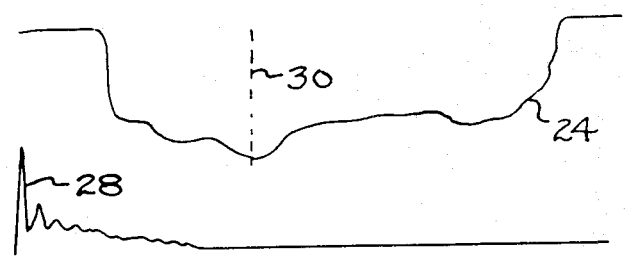

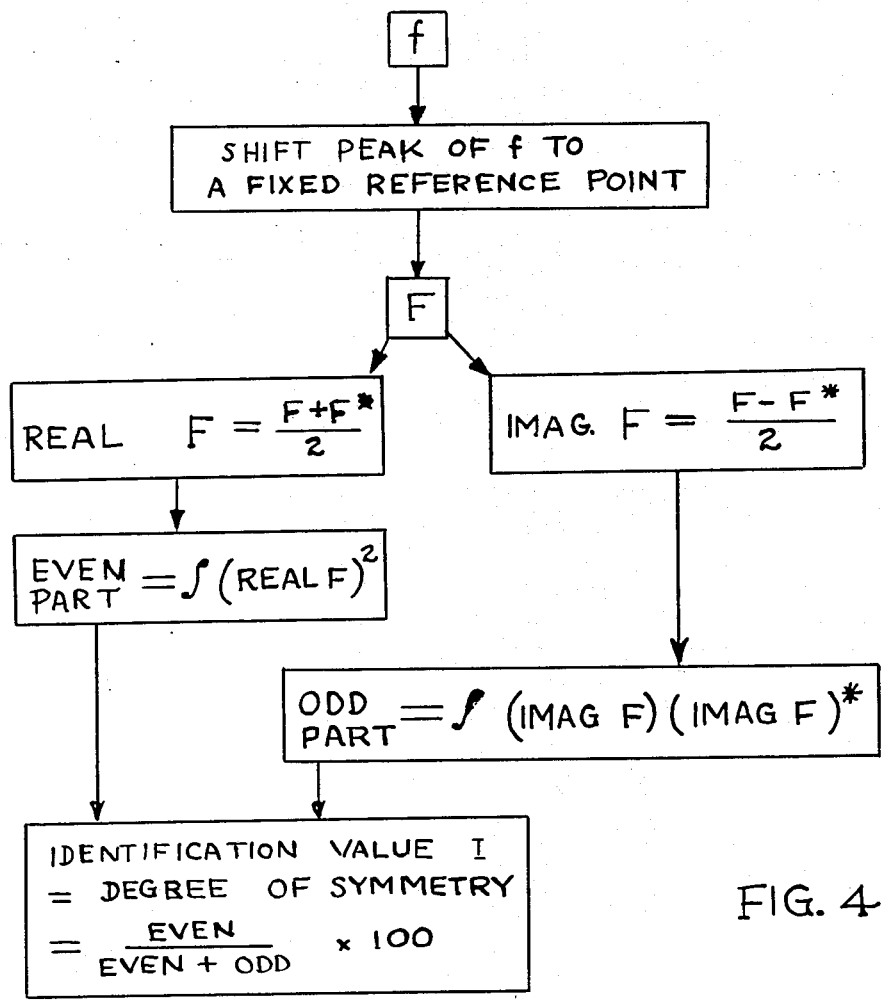

TWO-DIMENSIONAL IMAGE DATA REDUCER AND CLASSIFIER

GOVERNMENT INTEREST

The invention described herein may be manufactured, used, and licensed by or for the Government for governmental purposes without payment to us of any royalty thereon.

BACKGROUND AND SUMMARY OF THE INVENTION

U.S. Pat. No. 3,836,712 to P. G. Kornreich and S. T. Kowel discloses a pictorial information digital simulation technique that operates on the irradiance distribution of an image as a function of position. The device is a real time sensor which optimally determines the one-dimensional Fourier transform of a two-dimensional image, using the photo-acoustic surface properties of physical materials. This incoherent light device outputs to a single pair of terminals a set of time sequential voltages, each of which indicates the phase and amplitude of a particular Fourier component. The resulting ac output represents a bandwidth limited, undirectional Fourier transform of the image. This procedure creates a one-dimensional function out of the original two-dimensional image.

The present invention involves a somewhat analogous technique of Fourier transforming an image, using a digital technique which looks at the image irradiance as a function of position. The detected image is digitized either directly on a detector, or subsequently through an analog-to-digital converter, to produce an $n \times n$ pixel matrix whose elements correspond to the irradiance of the image at a particular pixel position. A large amount of data is quickly reduced to a single pair of n-component vectors by summing along the rows or columns of the pixel matrix. A one-dimensional Fourier transform representation of the image can be obtained from either of the two vectors. An $n^2$ component pixel matrix is reduced to a pair of n component image vectors. The number of pixels is effectively reduced from $n^2$ to $2n$. In an illustrative case a $512 \times 512$ matrix will be reduced from over a quarter million elements to 1024 elements, a reduction in data of about 99%. The signal-to-noise ratio of each component in the image vectors is increased approximately by a factor of $\sqrt{n}$. Data storage requirements are reduced significantly by scanning the image line by line and repeatedly adding to a single storage block of n words. Computation times are reduced as compared with operations on a two-dimensional Fourier transform image which may require over a million complex operations that can take a digital computer several minutes to complete, depending on the speed and memory capacity of the computer.

THE DRAWINGS

FIG. 1 schematically illustrates apparatus embodying our invention.

FIGS. 2 and 3 are typical vehicle silhouettes, their corresponding image vectors and one-dimensional Fourier transforms obtained by using the FIG. 1 apparatus.

FIG. 4 illustrates a method for utilizing Fourier transforms to calculate vehicle identification numbers.

FIG. 5 illustrates typical vehicle identification numbers obtained by using the FIG. 4 calculation methods.

Referring in greater detail to FIG. 1, there is shown a detector 10, which may be a visual or infrared imaging sensor, directed on a distant target vehicle 12 of unknown friendly or unfriendly character. Detector 10 includes, or has associated therewith, a digitizer 14 that is electrically connected to a Fourier analyzer 16. Detector 10 and digitizer 14 typically reproduce the target image on a monitor 18, shown in FIGS. 2 and 3. Digital adders sum the target video picture (pixel) elements along each horizontal or vertical scan direction. Pixel elements in the background (non-target) scene are ignored or discarded. A representative video image system may include 512 scan lines, each line containing 512 pixel elements.

In FIGS. 2 and 3 curve 22 depicts a vector where the target pixel elements are summed along the horizontal scan lines; curve 24 depicts the corresponding vectors of target pixel elements which are summed along the vertical scan lines. These summation vectors can be processed in a Fourier analyzer 16 (FIG. 1) to produce the one-dimensional Fourier transforms 26 and 28 of FIGS. 2 and 3. This process transforms signals 22 and 24 from the time domain into the frequency domain. U.S. Pat. No. 3,466,431 to A. M. Fuchs and S. C. Catania describes the general operation of a Fourier analyzer.

Summation vectors 22 and 24 are achieved according to the following general equations:

$$b_i = \sum_{j=1}^{n} a_{ij}$$

$$i,j = 1 \text{ to } n$$

$$c_j = \sum_{i=1}^{n} a_{ij}$$

where [a] is the pixel matrix, and b and c are the resultant orthogonal n-component image vectors. A one-dimensional Fourier transform of the image can be obtained from either of these two vectors. One particular application or usage for this concept is in determining a measure of detectability and identification for U.S. and threat vehicle targets. This particular algorithm involves the symmetry of the image vector about some unique point. If the maximum component 30 (FIGS. 2 and 3) in the image vector is chosen as the reference point, then the vector functions b and c can be separated into respective even and odd functions about this point of reference. If the image vectors are translated so the peak component is centered at the origin, then the even-odd function decomposition has a particularly simple form. The decomposition for b is given as follows:

$$b_{si} = \tfrac{1}{2}[b_i + b_{-i}]$$

$$b_{ai} = \tfrac{1}{2}[b_i - b_{-i}]$$

where $b_s$ and $b_a$ are respectively the symmetric and asymmetric parts of the general vector function b. This decomposition procedure is performed in the time domain and it is unique only when the reference point is positioned at the origin.

A numerical vehicle identification value I which is normalized from zero to 100% can be calculated from the symmetric/asymmetric function decomposition. A method for calculating I is illustrated in FIG. 4. The image vector f is positioned to a fixed reference point in the time domain. The vector F is the Fourier transform of f. The real part of $F(\omega)$ corresponds to the symmetric component of f and the imaginary part of F(ω) to the asymmetric component of f. If the DC frequency component is zero, then the area under the real part $F_R$ and imaginary part $F_I$ of $F=F_R+iF_I$ is zero. The components of $|F_R|^2$ and $|F_I|^2$ are positive; consequently, the total integrated areas under $|F_R|^2$ and $|F_I|^2$ are positive and equal to the area under $|F|^2$. The identification value I is calculated by the following expression:

$$I = 100 \int d\omega \frac{|F_R|^2}{|F|^2}$$

The quantity I can be calculated for either of the two image vectors and is invariant for scale and translation transformation. These values for I can be tabulated in a look-up table for vehicle identification. FIG. 5 shows identification values for the vehicles depicted in FIGS. 2 and 3.

The use of the derivative f' of the time space vector f adds flexibility to the above algorithm. This operation multiplies F point by point by $-i\omega$ and enhances the higher frequencies, attenuates the lower frequencies and eliminates any DC component. The identification factor I is now computed for this new f' vector to identify the vehicle.

A useful property of the above algorithm is that I is the same for the right and left sides of the vehicle if they are mirror images of one another. The mirror image vector is obtained by setting $t \rightarrow -t$. The factor I is independent of this time inversion.

Since a translational shift in the time domain corresponds to a phase shift in the frequency domain, the quantity I is highly dependent upon the first step in the algorithm which shifts the peak component of f to a fixed reference point. The presence of noise spikes and other irregularities in the vehicle signal causes serious errors in the location of the peak vector component. Image vectors which are nearly flat in regions near the peak component or have multiple relative maxima with nearly the same values can also produce major errors. One solution which reduces these problems smooths the interval containing the peak valued component of f by convolving it with the mean filter consisting of a rectangular bar n channels wide with unit area. This operation decreases the error due to peak value location but at the expense of decreased high frequency resolution. This procedure may be repeated for several iterations to obtain the time coordinate of the peak of the smoothed vector f. This point is considered as a reference point for the image vector f and is shifted to the origin to compute the identification value I of the image. Shifting at this point will improve the consistency of the results.

The two image vectors b and c are also useful to detect motion in an image. This can be very beneficial in surveillance applications. By continuously scanning and summing an image from a fixed camera position, and then computing the difference between scans, we can detect if anything in the image has changed. Any non-zero components in the difference vectors imply some form of motion along the summed line corresponding to that point. By comparing the differences between three or more scans and knowing the approximate distance to the target we can determine the direction and velocity of the motion.

A second motion detection algorithm utilizing the image vectors is based on a theorem of Fourier transforms which states that translational motion in the time domain corresponds to a pure phase shift in the frequency domain. That is, if f(t) has the Fourier transform F(ω) then f(t−Δt) has the Fourier transform $e^{-i\omega \Delta t}F(\omega)$. Each component is delayed in phase by an amount proportional to ω. The higher the frequency the greater the change in phase angle.

Assume we are analyzing a single one-dimensional scan of an image along which an object is moving. This signal f(t) will be composed of a stationary background component b(t) and a moving part m(t). As the moving object travels across our field-of-view it masks and unmasks part of the stationary background. The image signal f(t) observed is given by:

$$f(t) = b(t) \cdot h(t) + m(t)$$

where h(t) is a binary function which has a value of zero in the masked region and one elsewhere.

Since multiplication in the time domain corresponds to convolution in the frequency domain then $$F(\omega) = B(\omega) \times H(\omega) + M(\omega)$$

where F, B, H and M are the respective Fourier transforms of f, b, h and m. If the moving part M(t) has shifted by an amount Δt then $$M(t) \rightarrow M(t+\Delta t), \; M(\omega) \rightarrow M(\omega)e^{i\Delta\phi}$$

$$h(t) \rightarrow h(t+\Delta t), \; H(\omega) \rightarrow H(\omega)e^{i\Delta\phi}$$

This implies the transform of the observed image signal becomes $$F(\omega) = T(\omega)e^{i\Delta\phi} \times B(\omega) + V(\omega)e^{i\Delta\phi}$$
$$= e^{i\Delta\phi}\{T(\omega) \times B(\omega) + V(\omega)\}$$

which implies the phase has shifted by Δφ and the magnitude of the transform is unaffected.

The phase of any Fourier component can be analyzed to give the time shift Δt of the signal M(t). Values of the phase of the image signal can be computed and plotted at successive time intervals. The derivative of this plot is proportional to the instantaneous velocity of the moving object.

We wish it to be understood that we do not desire to be limited to the exact details of construction shown and described for obvious modifications will occur to a person skilled in the art.

We claim:

1. A method for obtaining target vehicle identification values representing a target outline configuration within a detector's field of view, comprising the steps of:
   a. digitizing the target image into a two dimensional array of pixels;
   b. summing target image pixels along one scan dimension to provide a first image vector b;
   c. summing target image pixels along the other orthogonal dimension to provide a second image vector c;
   d. shifting image vector b normal to the scan direction such that the maximum component is at a fixed reference point;
   e. Fourier transforming the shifted image vector in step d to obtain F;

f. obtaining the real part of F by summing F and its conjugate F* and dividing the resultant vector by 2;
g. obtaining the imaginary part of F by subtracting F* from F and dividing the resultant vector by 2;
h. obtaining a numerical value representing the symmetric part of F in step e by integrating over the square of the real part of F;
i. obtaining a numerical value representing the asymmetric part of F by integrating over the product of the imaginary part of F and the conjugate of the imaginary part of F;
j. obtaining the identification value of image vector b by dividing the numerical value in step h by the sum of the values in steps h and i;
k. repeating steps d through j, using the second image vector c; and
l. in a look-up table predefined in memory, looking up the vehicle corresponding to the identification values obtained by following steps a through k.

* * * * *